United States Patent
Hirai

(10) Patent No.: US 9,605,151 B2
(45) Date of Patent: Mar. 28, 2017

(54) MICROEMULSION COMPOSITION AND A FIBER TREATING AGENT

(71) Applicant: SHIN-ETSU CHEMICAL CO., LTD., Tokyo (JP)

(72) Inventor: Motohiko Hirai, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 322 days.

(21) Appl. No.: 14/049,663

(22) Filed: Oct. 9, 2013

(65) Prior Publication Data

US 2014/0109795 A1    Apr. 24, 2014

(30) Foreign Application Priority Data

Oct. 23, 2012   (JP) ................................. 2012-233844

(51) Int. Cl.

| | | |
|---|---|---|
| *D06M 15/643* | (2006.01) | |
| *C08L 83/12* | (2006.01) | |
| *C08G 77/46* | (2006.01) | |
| *D06M 13/184* | (2006.01) | |
| *D06M 15/53* | (2006.01) | |

(52) U.S. Cl.
CPC .............. *C08L 83/12* (2013.01); *C08G 77/46* (2013.01); *D06M 13/184* (2013.01); *D06M 15/53* (2013.01); *D06M 15/6436* (2013.01)

(58) Field of Classification Search
CPC ........ C08L 83/12; C08G 77/46; D06M 3/184; D06M 15/53; D06M 15/6436
See application file for complete search history.

(56) References Cited

U.S. PATENT DOCUMENTS

| | | |
|---|---|---|
| 4,620,878 A | 11/1986 | Gee |
| 5,244,598 A | 9/1993 | Merrifield et al. |
| 5,258,451 A | 11/1993 | Ohsawa et al. |
| 5,712,343 A | 1/1998 | Geck et al. |

FOREIGN PATENT DOCUMENTS

| | | |
|---|---|---|
| JP | A 60-127327 | 7/1985 |
| JP | A 4-279667 | 10/1992 |
| JP | A 5-98161 | 4/1993 |
| JP | A 5-209058 | 8/1993 |
| JP | A 8-73747 | 3/1996 |
| JP | A 8-73748 | 3/1996 |
| JP | B 2591912 | 3/1997 |
| JP | A 11-292977 | 10/1999 |
| JP | 2011-001419 A | 1/2011 |

*Primary Examiner* — Kaj K Olsen
*Assistant Examiner* — Alexander Polyansky
(74) *Attorney, Agent, or Firm* — Oliff PLC

(57) ABSTRACT

Disclosed is a microemulsion for a fiber treating agent providing softness, hydrophilicity, improving texture of a fiber and stability and dilution ability. A microemulsion composition includes the following components (A) to (E): (A) a linear organopolysiloxane having two or more polyoxyalkylene-containing organic groups represented by $-CH_2-CH(OH)CH_2O-(C_2H_4O)_b-(C_3H_6O)_c-Z$ per molecule and a viscosity at 25° C. of 100 to 5,000 mPa·s in an amount of 80-98 mass %, (B) a nonionic surfactant, with an HLB factor of 12-16, in an amount of 1-10 parts by mass, based on 100 parts by mass of the component (A), (C) an anionic surfactant in an amount of 0 to 3 parts by mass, based on 100 parts by mass of the component (A), (D) an organic acid in an amount of 0.5-2 parts by mass, based on 100 parts by mass of the component (A), and (E) water in an amount of 1-5 mass %.

7 Claims, No Drawings

MICROEMULSION COMPOSITION AND A FIBER TREATING AGENT

CROSS REFERENCE

This application claims the benefits of Japanese Patent application No. 2012-0233844 filed on Oct. 23, 2012, the contents of which are hereby incorporated by reference.

FIELD OF THE INVENTION

The present invention relates to a microemulsion composition. Specifically, the present invention relates to a microemulsion composition which comprises an organopolysiloxane in a high concentration and easily forms a microemulsion having a desired concentration by adding water, and to a fiber treating agent comprising the microemulsion composition.

BACKGROUND OF THE INVENTION

Organopolysiloxane emulsion has been used widely in the various industrial fields such as in fiber treating agents, mold release agents, lustering agents, antifoaming agents and hair cosmetics. In the fiber treating field, various treating agents have been proposed to improve properties such as softness or smoothness of fiber products made of various natural fibers or synthetic fibers so as to provide good texture to the fiber products. For instance, a treating agent which mainly comprises a dimethylpolysiloxane or an amino group-containing organopolysiloxane is known. The silicone-type fiber treating agent is emulsified generally with an emulsifier and used as an oil-in-water emulsion. However, when the amino group-containing organopolysiloxane is used in an emulsion form, the emulsion requires stability, particularly shear stability in diluting. Therefore, it was considered to make a diameter of emulsion particles smaller and, to that end, many kinds of microemulsions and production methods therefor have been proposed.

Japanese Patent Application Laid-Open No. Sho-60-127327 describes a method wherein an insoluble emulsifier and water are added to an organopolysiloxane which has a polar group such as an amino group to form a semi-transparent oil concentrate and, then, the concentrate is dispersed rapidly in water. Japanese Patent Application Laid-Open No. Hei-5-98161 describes a method wherein a poorly water-soluble alcohol and a surfactant are added in a mixture of an amino group-containing polyorganosiloxane and water to emulsify. Japanese Patent Application Laid-Open No. Hei-5-209058 describes a method wherein water is added to a mixture of an amino functionalized polyorganosiloxane and a surfactant and stirred to obtain a homogeneous mixture and, then, the mixture is diluted with further water, to which a lower aliphatic carboxylic acid or an inorganic acid is then added to form a water-soluble salt. Japanese Patent No. 2591912 describes a method for preparing a microemulsion by emulsifying an organopolysiloxane together with a diethylene glycol monobutylether. Japanese Patent Application Laid-Open No. Hei-8-73747 describes a method wherein an amino group-containing organopolysiloxane is neutralized with an amino acid and emulsified to disperse. Japanese Patent Application Laid-Open No. Hei-8-73748 describes a method for preparing a microemulsion wherein an amino group-containing organopolysiloxane is neutralized with an amino acid and emulsified together with glycol ether having a short alkyl group having 4 or less carbon atoms such as methyl, ethyl, propyl, and butyl groups to disperse. However, in all of the aforesaid production methods, it is difficult to provide a small particle microemulsion with good reproducibility.

The present inventor proposed, in Japanese Patent Application Laid-Open No. Hei-4-279667, a method to make an amino group-containing organopolysiloxane having polyether groups at the both terminals emulsified with a nonionic surfactant so as to provide a microemulsion which provides excellent softness to a fiber to attain an effect of improving texture, and which has a small diameter and good stability. Further, the present inventor proposed, in Japanese Patent Application Laid-Open No. Hei-11-292977, a method wherein water for phase inversion is added to a mixture of an amino group-containing organopolysiloxane and a nonionic surfactant to emulsify them under high shearing and, then, the obtained non-fluid gel product is subjected to first kneading. Subsequently, an aqueous acid solution is added to the product to obtain a thick paste, which is then subjected to second kneading and, further if need, a dilution water is added and mixed.

PRIOR LITERATURES

Patent Literatures

[Patent Literature 1] Japanese Patent Application Laid-Open No. Sho-60-127327
[Patent Literature 2] Japanese Patent Application Laid-Open No. Hei-5-98161
[Patent Literature 3] Japanese Patent Application Laid-Open No. Hei-5-209058
[Patent Literature 4] Japanese Patent No. 2591912
[Patent Literature 5] Japanese Patent Application Laid-Open No. Hei-8-73747
[Patent Literature 6] Japanese Patent Application Laid-Open No. Hei-8-73748
[Patent Literature 7] Japanese Patent Application Laid-Open No. Hei-4-279667
[Patent Literature 8] Japanese Patent Application Laid-Open No. Hei-11-292977

SUMMARY OF THE INVENTION

The method described in Japanese Patent Application Laid-Open No. Hei-4-279667 offers a simple and easy production process, but is not practicable. The method described in Japanese Patent Application Laid-Open No. Hei-11-292977, can make a diameter of emulsion particles smaller, but is difficult to prepare a transparent microemulsion having a mean particle diameter of 50 nm or less. Therefore, development of a microemulsion is desired, which has good stability, can provide good softness to a fiber and can be prepared in a simple and easy step.

Therefore, one object of the present invention is to provide a microemulsion for a fiber treating agent which can be prepared in a simple and easy step, which fiber treating agent provides excellent softness, particularly together with hydrophilicity, i.e. water absorbability, to a fiber and has an effect of improving texture of a fiber and stability and dilution ability.

To solve the aforesaid problems in the prior art, the present inventor tried to prepare a microemulsion composition comprising an organopolysiloxane having an amino group and a polyoxyalkylene group in a high concentration of 80 mass % or more. However, such a composition comprises the organopolysiloxane in such a high concentration showed decreased storage stability. Further, when water is added to the composition to dilute it to a desired concentration for a treating agent, dispersibility of the composition in water is worse.

The present inventor has further made research and found that a composition comprising an amino- and polyoxyalkylene groups-containing linear organopolysiloxane represented by the following formula (4), a nonionic surfactant having an HLB factor of 12 to 16, organic acid and water in the specific amounts can easily cause phase invertion to attain an oil-in-water microemulsion having a mean particle diameter of 50 nm or less. Even when the amount of the organopolysiloxane is more than 80 mass %, the composition is colorless and transparent in a broad range of dilution, and has good storage stability and mechanical stability. Additionally, a fiber treating agent comprising the microemulsiton composition provides excellent softness, particularly together with hydrophilicity, i.e. water absorbability, to a fiber to attain a good effect of improving texture of the fiber.

Thus, the present invention provides a microemulsion composition comprising the following components (A) to (E):

(A) a linear organopolysiloxane having a group represented by the following formula (4) and a viscosity at 25 degrees C. of 100 to 5,000 mPa·s in an amount of 80 to 98 mass %, based on the whole mass of the composition,

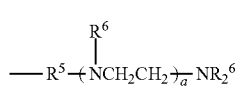

(4)

wherein $R^5$ is a divalent hydrocarbon group having 1 to 8 carbon atoms; a is an integer of from 0 to 4; $R^6$ is, independently of each other, a hydrogen atom or a polyoxyalkylene-containing organic group represented by —$CH_2$—$CH(OH)CH_2O$—$(C_2H_4O)_b$—$(C_3H_6O)_c$—Z, wherein Z is one selected from a hydrogen atom, substituted or unsubstituted monovalent hydrocarbon groups having 1 to 12 carbon atoms and acyl groups, b is an integer of from 2 to 30, c is an integer of from 0 to 20, and the oxyethylene unit and the oxypropylene unit may form a block polymeric part or a random polymeric part; and said linear organopolysiloxane has said two or more polyoxyalkylene-containing organic groups per molecule, (B) one or more kinds of nonionic surfactant, wherein the component (B) has an HLB factor of 12 to 16, in an amount of 1 to 10 parts by mass, based on 100 parts by mass of the component (A), (C) an anionic surfactant in an amount of 0 to 3 parts by mass, based on 100 parts by mass of the component (A), (D) an organic acid in an amount of 0.5 to 2 parts by mass, based on 100 parts by mass of the component (A), and (E) water in an amount of 1 to 5 mass %, based on the whole mass of the composition,
and a fiber treating agent comprising the microemulsion composition.

The present microemulsion composition has good storage stability and dilution ability in spite of a high concentration of the amino and polyoxyalkylene groups-containing organopolysiloxane. Accordingly, the present microemulsion composition provides a fiber treating agent having good storage stability and dilution ability. Further, the treating agent provides excellent softness, particularly together with hydrophilicity, i.e. water absorbability, to a fiber and has a good effect of improving texture of the fiber.

DETAILED DESCRIPTION OF THE INVENTION

The present invention will be described below in detail.
(A) Organopolysiloxane
The component (A) is a linear organopolysiloxane having a group represented by the following formula (4):

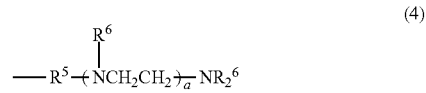

(4)

The organopolysiloxane has a viscosity at 25 degrees C. of 100 to 5,000 mPa·s, preferably 200 to 3,000 mPa·s, more preferably 300 to 2,000 mPa·s, further preferably 400 to 1,000 mPa·s. In the present invention, the viscosity is determined at 25 degrees C. with a BM type viscosity meter, for instance, ex. Tokyo Keiki Co., Ltd. The linear organopolysiloxane may have a few amounts of branched structures in a part of the molecule. In the linear organopolysiloxane, the group represented by the aforesaid formula (4) bonds to a silicon atom on a polysiloxane skeleton and may be at the terminal or anywhere in the molecule. The organopolysiloxane preferably has at least one, more preferably two or more, particularly 2 to 10, groups represented by the afore-mentioned formula (4) per molecule.

In the formula (4), $R^5$ is a divalent hydrocarbon group having 1 to 8 carbon atoms. Examples of the divalent hydrocarbon group include alkylene groups such as methylene, dimethylene, trimethylene, and tetramethylene groups. Among these, a trimethylene group is preferable. a is an integer of from 0 to 4, preferably 1 or 2.

In the formula (4), $R^6$ is, independently of each other, a hydrogen atom or a polyoxyalkylene-containing organic group represented by —$CH_2$—$CH(OH)CH_2O$—$(C_2H_4O)_b$—$(C_3H_6O)_c$—Z. The present organopolysiloxane has the two or more, preferably three or more, polyoxyalkylene-containing organic group per molecule. In the aforesaid formula, b is an integer of from 2 to 30, preferably 2 to 20. If b is smaller than the lower limit, the effect of providing softness and hydrophilicity, i.e. water absorbability, to a fiber is insufficient. If b is larger than the upper limit, the softness of the fiber is insufficient. c is an integer of from 0 to 20, preferably 0 to 10, more preferably 0 or an integer of from 1 to 5. If c is larger than the upper limit, the hydrophilicity, i.e. water absorbability, of the fiber is insufficient. The polyoxyethylene unit and polyoxypropylene unit may be copolymeric, and may form a block polymeric part or a random polymeric part.

In the polyoxyalkylene-containing organic group, Z is selected from a hydrogen atom, a substituted or unsubstituted monovalent hydrocarbon group having 1 to 12, preferably 1 to 8, carbon atoms, and acyl groups. Examples of the monovalent hydrocarbon group include alkyl groups such as methyl, ethyl, propyl, butyl, pentyl, hexyl, heptyl, octyl, nonyl, decyl, dodecyl, tetradecyl, hexadecyl, octadecyl and eicosyl groups; cycloalkyl groups such as cyclopentyl and cyclohexyl groups; aryl groups such as phenyl and tolyl groups; alkenyl groups such as vinyl and allyl groups; and these groups where a part or the whole of their hydrogen atoms bonding to a carbon atom are replaced with a halogen atom(s), such as chlorine and fluorine atoms, for instance, halogenated alkyl groups and halogenated alkenyl groups. Among these, Z is preferably a hydrogen atom, an alkyl group such as methyl, ethyl, propyl, and butyl groups, or an acyl group such as acetyl and benzoyl groups, in particular, methyl, butyl and acetyl groups.

The component (A) is preferably at least one organopolysiloxane represented by the following general formulas (1), (2) and (3).

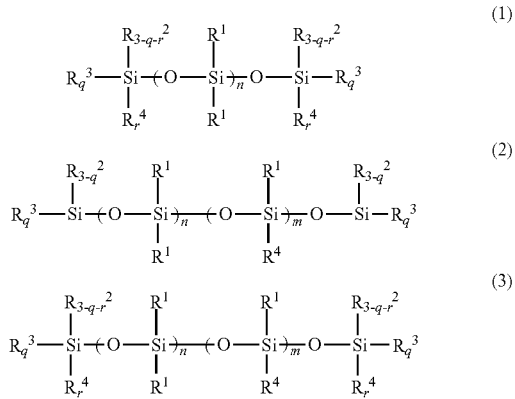

wherein $R^4$ is, independently of each other, the group represented by the afore-mentioned formula (4).

In the formulas (1) to (3), $R^2$ is, independently of each other, a substituted or unsubstituted monovalent hydrocarbon group having 1 to 12, preferably 1 to 8, carbon atoms. Examples of the monovalent hydrocarbon group include alkyl groups such as methyl, ethyl, propyl, butyl, pentyl, hexyl, heptyl, octyl, nonyl, decyl, dodecyl, tetradecyl, hexadecyl, octadecyl, and eicosyl groups; cycloalkyl groups such as a cyclopentyl group and a cyclohexyl group; aryl groups such as a phenyl group and a tolyl group; alkenyl groups such as a vinyl group and an allyl group; and these groups where a part or the whole of their hydrogen atoms bonding to carbon atoms are replaced with a halogen atom(s), such as chlorine and fluorine atoms, for instance, halogenated alkyl groups and halogenated alkenyl groups. Among these, a methyl group is industrially preferred.

In the formulas (1) to (3), $R^3$ is, independently of each other, a group represented by —OX. X is a hydrogen atom or a group defined for $R^2$. X is preferably a hydrogen atom or alkyl groups such as methyl, ethyl, propyl, butyl, pentyl, hexyl, heptyl and octyl groups. Among these, $R^3$ is preferably a hydroxyl, methoxy or ethoxy group.

In the formulas (1) to (3), $R^1$ is, independently of each other, selected from $R^2$ or $R^3$. q is, independently of each other, an integer of from 0 to 3, r is, independently of each other, 0 or 1, and a total of q and r is 0 to 3 at each of the terminals, provided that the formulas (1) and (3) have $R^4$ at at least one terminal. Preferably, formulas (1) to (3) have at least one $R^3$ in the molecule, q is 1 or 2, more preferably 1. In particular, q is 1 at the both terminals. In the formula (1), it is preferable that r is 1 at the both terminals.

In the formulas (1) to (3), n is an integer of from 10 to 200, preferably 20 to 100. If n is smaller than the lower limit, the effect of providing softness or smoothness to a fiber is insufficient. If n is larger than the upper limit, a viscosity of the organopolysiloxane having the polyoxyalkylene group is higher, so that the handling and emulsifying the composition is difficult. m is an integer of from 1 to 5.

In the organopolysiloxane represented by the formulas (1) to (3), two or more, preferably three or more, of $R^6$ are the polyoxyalkylene-containing organic group. Because of the polyoxyalkylene-containing organic group, the composition can provide softness together with good hydrophilicity, i.e. water absorbability, to a fiber and reduce yellowing of the fiber. It is necessary that two or more of $R^6$ are polyoxyalkylene-containing organic groups, and the larger number of polyoxyalkylene-containing organic groups are better. In particular, 67% or more, preferably 85% or more, more preferably 100%, of the total number of $R^6$ is the polyoxyalkylene-containing organic group.

Examples of the organopolysiloxanes represented by the formulas (1) to (3) include the following ones.

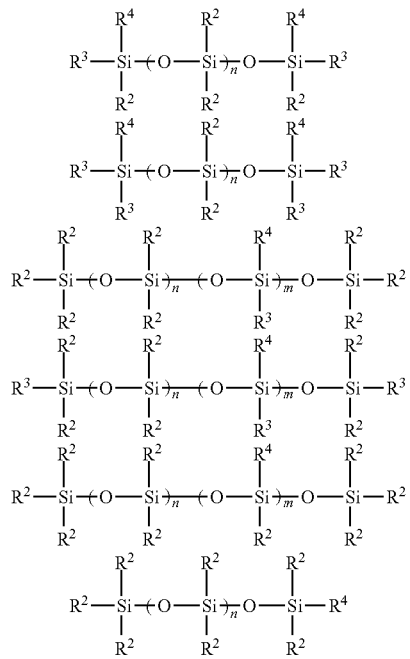

wherein $R^2$, $R^3$, $R^4$, n and m are as defined above.

Among these, the organopolysiloxane represented by the following formula is particularly preferred.

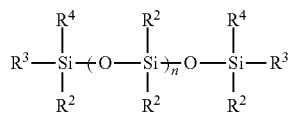

wherein $R^2$, $R^3$, $R^4$ and n are as defined above.

The organopolysiloxane represented by the formulas (1) to (3) can be easily obtained by reacting an organopolysiloxane represented by the following general formula (5), (6) or (7) with a polyoxyalkylene monoglycidylether represented by the following general formula (8).

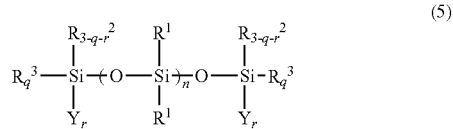

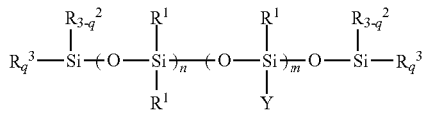

(6)

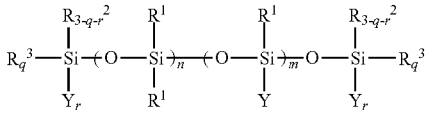

(7)

In the formulas (5) to (7), $R^1$, $R^2$, $R^3$, n, m, q and r are as defined above. Y is a group represented by $—R^5(NHCH_2CH_2)_aNH_2$, wherein $R^5$ and a are as defined above.

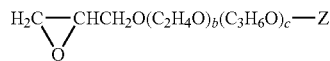

(8)

In the formula (8), b, c and Z are as defined above.

Examples of the organopolysiloxanes represented by the formulas (5) to (7) include the following ones.

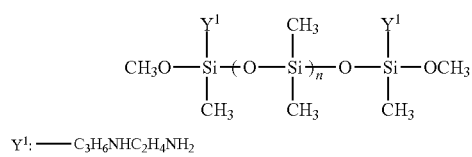

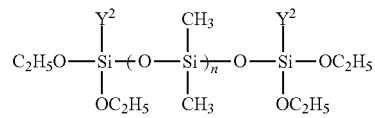

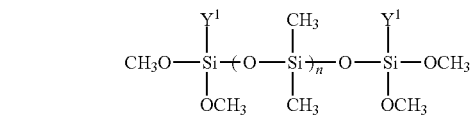

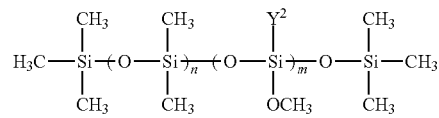

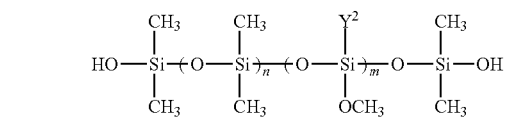

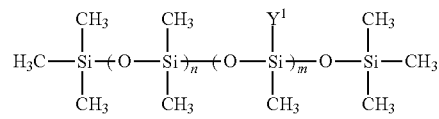

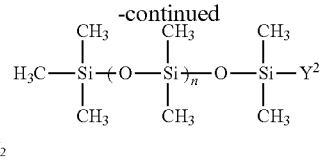

$Y^2$: —$C_3H_6NH_2$

In the formulas, n and m are as defined above.

Examples of the polyoxyalkylene monoglycidylether represented by the general formula (8) include the following ones.

$H_2C$—$CHCH_2O(C_2H_4O)_b$—$C_4H_9$
  \O/

$H_2C$—$CHCH_2O(C_2H_4O)_b(C_3H_6O)_c$—$C_4H_9$
  \O/

In the formulas, b and c are as defined above.

The organopolysiloxane represented by the formula (5), (6) or (7) and the polyoxyalkylene monoglycidylether represented by the formula (8) may be reacted in a ratio such that two or more of $R^6$ in the organopolysiloxane obtained are —$CH_2$—$CH(OH)CH_2O$—$(C_2H_4O)_b$—$(C_3H_6O)_c$—Z. In particular, a ratio of the number of a glycidyl group in the polyoxyalkylene monoglycidylether represented by the formula (8) to the total number of a hydrogen atom bonding to a nitrogen atom, as —NH, in the organopolysiloxane represented by the formula (5), (6) or (7) is 0.67 or more, more preferably 0.85 or more, further preferably 1.0. The amino group-containing organopolysiloxane may be reacted with the polyoxyalkylene monoglycidylether in a conventional manner. For instance, the reaction may be conducted in the absence of or presence of a solvent such as lower alcohol, toluene and xylene at 50 to 100 degrees C. for 1 to 5 hours.

The amino group-containing organopolysiloxane represented by the formula (5) can be easily prepared in a publicly known manner. For instance, a dimethylpolysiloxane whose both terminals are capped with a hydroxyl group are reacted with 3-aminopropyldiethoxysilane or N-(2-aminoethyl)-3-aminopropylmethyldimethoxysilane, leaving methanol, in the absence of or presence of a catalyst such as an alkali metal hydroxide.

The amino group-containing organopolysiloxane represented by the formula (6) or (7) also can be easily prepared in a publicly known manner. For instance, a cyclosiloxane such as octamethylcyclotetrasiloxane, is equibrium reacted with 3-aminopropyldiethoxysilane or N-(2-aminoethyl)-3-aminopropylmethyldimethoxysilane or a hydrolysate thereof, and another compound such as hexamethyldisiloxane in the presence of a catalyst such as an alkali metal hydroxide and tetramethylammonium hydroxide. Component (A) may have a branch in the organopolysiloxane skelton.

In the present invention, the amount of the component (A) in the microemulsion composition is 80 to 98 mass %, preferably 85 to 95 mass %, based on the whole mass of the components. If the amount of the component (A) is smaller than the lower limit, the concentration is too low, which is economically less desired. If the amount of the component (A) is larger than the upper limit, the storage stability of and dilution ability of the emulsion are worse.

(B) Nonionic Surfactant

The component (B) is one or more kinds of nonionic surfactant which has an HLB factor of 12 to 16, preferably 13 to 15. Because the component (B) has the afore-mentioned HLB factor, the microemulsion can be satisfactorily obtained. Any publicly known nonionic surfactant may be used as the present nonionic surfactant, as long as it has the afore-mentioned HLB factor.

The component (B) may be one kind of nonionic surfactant or a mixture of two or more kinds of nonionic surfactants having different HLB factors. When two or more kinds of nonionic surfactants are combined, the difference between HLB factors of at least two of the nonionic surfactants is preferably 1 or more, more preferably 2 or more, and an HLB factor of the whole mixture is 12 to 16, preferably 13 to 15. A nonionic surfactant whose HLB factor is not in the range of 12 to 16 may be combined, provided that an HLB factor of the whole mixture be 12 to 16, preferably 13 to 15. Here, the HLB factor of the whole mixture is a weighted average of HLB factors of all nonionic surfactants.

Examples of the nonionic surfactant include polyoxyalkylene alkyl ether, polyoxyalkylene alkyl phenolether, polyoxyalkylene alkyl ester and polyoxyalkylene sorbitan alkyl ester. Among these, polyoxyalkylene alkyl ether represented by the general formula $RO(C_2H_4O)_p(C_3H_6O)_uH$ is preferred. In the formula, R is a linear or branched alkyl group having 8 to 30 carbon atoms, preferably 8 to 13 carbon atoms; and p and u are, independently of each other, 0 to 50, preferably 0 to 25, provided that a total of p and u are 1 or more. The polyoxyethylene unit and polyoxypropylene unit may be copolymeric, and may form a block polymeric part or a random polymeric part.

The amount of the component (B) is 1 to 10 parts by mass, preferably 3 to 8 parts by mass, per 100 parts by mass of the component (A). If the amount is smaller than the lower limit, no microemulsion can be obtained. If the amount is larger than the upper limit, storage stability of the emulsion obtained is worse.

(C) Anionic Surfactant

The component (C) is an anionic surfactant. Any publicly known anionic surfactant may be used. In particular, an anionic surfactant represented by the general formula $R'OSO_3M$ or $R'$—Ph—$OSO_3M$ is preferred. In the formulas, R' is a linear or branched alkyl group having 8 to 30, preferably 8 to 12, carbon atoms. M is a hydrogen atom or a metal element, particularly preferably a hydrogen atom, an alkali metal element or an alkaline earth metal element.

Examples of the anionic surfactant include hexylbenzenesulfonic acid, octylbenzenesulfonic acid, decylbenzenesulfonic acid, dodecylbenzenesulfonic acid, cetylbenzenesulfonic acid, myristylbenzenesulfonic acid and a salt thereof. A higher fatty acid such as lauric acid, stearic acid, oleic acid and linolenic acid, and salts thereof; sulfate ester of a polyoxyethylene monoalkylether represented by the general formula $R'O(EO)_s(PO)_tSO_3M$ or $R'$—Ph—$O(EO)_s(PO)_tSO_3M$, alkylnaphthylsulfonic acid and a salt thereof may also be used, wherein R' and M is as defined above, s and t are, independently of each other, an integer of from 0 to 30, provided that a total of s and t is 1 or more. EO is an abbreviation of ethylene oxide; PO, propylene oxide; and Ph, phenyl group. Among these, a sulfate ester of polyoxyethylene monoalkylether is preferred.

The amount of the component (C) is 0 to 3 parts by mass, preferably 0.5 to 2 parts by mass, per 100 parts by mass of the component (A).

(D) Organic Acid

The component (D) is an organic acid. Because of the organic acid, a part of the amino group of the component (A) and organic acid (D) form a quaternary salt at the time of emulsification and, therefore, a microemulsion can be obtained. The amount of the component (D) is 0.5 to 2 parts by mass, preferably 1.0 to 1.5 parts by mass, per 100 parts by mass of the component (A). To express the aforesaid parts by mass in a molar equivalent, the amount of the component (D) is 0.1 to 0.4 molar equivalent, preferably 0.2 to 0.3 molar equivalent, relative to one molar equivalent of the whole amino groups, i.e. —$NR^6$ and —$NR^6{}_2$, of the component (A). If the amount of the organic acid is larger than the upper limit, viscosity of the emulsion composition is higher and yellow discoloration occurs in storage. Further, the dispersibility in dilution is poor and, therefore, a transparent and colorless treating agent will not be obtained. If the amount of the organic acid is smaller than the lower limit, no microemulsion can be obtained.

The organic acid may be properly selected from publicly known ones. Examples of the organic acid include formic acid, acetic acid, lactic acid, propionic acid, lauric acid, stearic acid, glutamic acid, asparagine acid, oxyglutamic acid, butyric acid, glycolic acid and hydroxy acid. Among these, a carboxylic acid such as formic acid, acetic acid and lactic acid, and hydroxy acid are preferred.

(E) Water

The present microemulsion composition comprises water. The amount of water in the microemulsion composition is 1 to 5 mass %, preferably 1.5 to 4 mass %, more preferably 2 to 4 mass %, based on the whole mass of the composition. The water works, for instance, to invert phases, i.e. works as phase inversion water.

The microemulsion composition may be prepared according to any conventional manner. For instance, the components (A) to (D) and (E) water are blended and made to cause phase inversion from oil-in-water emulsion to water-in-oil by a shearing force and, then, kneaded for dispersion to obtain a microemulsion composition. When the anionic surfactant (C) is provided as an aqueous solution, the water existing in the aqueous solution may be the component (E) and no additional water is required. As an emulsification equipment, for instance, Homo Mixer, homogenizer, colloid mill, universal mixing and stirring machine, combi mix and line mixer may be used, but not limited thereto. For instance, when Homo Mixer is used, it is preferred that the composition are mixed at 1000 to 5000 rpm to cause phase inversion and, then, further mixed at 1000 to 2000 rpm for 10 to 30 minutes.

The present microemulsion composition disperses well in water in a broad dilution range to be transparent and colorless. That appearance of a dilution is transparent and colorless is judged by a Hazen color value (APHA). In particular, the dilution of the microemusion preferably has a Hazen color value (APHA) of 10 or less. Determination of a Hazen color value may be conducted by the naked eye or a Hazen meter. In the determination with the naked eye, for instance, standard solutions having different Hazen color value, e.g. Hazen color values of from 10 to 1000 are used. Particularly, ten standard solutions having an interval of 10 are provided for the range of the Hazen color value of 10 to 100 and another ten standard solutions having an interval of 100 are provided for the range of the Hazen color value of 100 to 1000. The color of the sample is compared with the standard solutions by the naked eye to determine which standard solution had color similar to the sample's color. The present microemulsion composition has well dispersibility. Particularly when the composition is diluted with water to a concentration of 30 mass % or less, it disperses smoothly to give a colorless and transparent dilution.

The emulsion particles in the present microemulsion composition have a mean particle diameter of 50 nm or less, preferably 40 nm or less, more preferably 30 nm or less, further preferable 20 nm or less. If the mean particle is larger than the upper limit, the transparency of the dilution and the dispersibility of the emulsion composition are worse. In the present invention, the mean diameter of the emulsion particles is determined by the dynamic light diffusion method. For example, the mean particle diameter is determined by N4 Plus Submicron Particle Size Analyzer, ex. Beckman Coulter, Inc.

The present invention provides a fiber treating agent comprising the afore-mentioned microemulsion composition. The amount of the microemulsion composition is 0.5 to 30 mass %, preferably 1 to 5 mass %, in the fiber treating agent to exhibit the effects and good usability. If the amount is smaller than the lower limit, the effect of providing softness to a fiber is sometimes insufficient. If the amount is larger than the upper limit, sticky and oily feeling occurs to give unfavorable texture. A method for preparing a fiber treating agent may be any conventional manner. For instance, the microemulsion composition is diluted with water to a desired concentration to provide the fiber treating agent.

The fiber treating agent of the present invention may contain other proper materials as long as the effects of the present invention are not obstructed. Examples of the other materials include a thickening agent, an anti-crease agent, a flame retardant, an antistatic agent, an antioxidant, an anti-septic, an anti-rust agent, an emulsifying agent, an emulsifying aid, a perfume and a dye.

Any fiber and fiber products may be treated with the present fiber treating agent. For instance, natural fibers such as cotton, silk, linen, wool, angora and mohair; and synthetic fibers such as polyester, nylon, acrylic and spandex fibers may be treated with the present fiber treating agent. A form and type of the fiber is not limited to particular one. For instance, raw materials such as staple fiber, filament, tow and yarn, or various processed ones such as textile, knit, wadding and non-woven fabric may be treated with the present fiber treating agent. A manner for treating a fiber with the present fiber treating agent may be any conventional one. For instance, a fiber product is dipped in the fiber treating agent to give the treating agent to the product and, then, an excessive amount of the treating agent is removed with rolls or a centrifugal machine to control the amount of the deposited agent. Subsequently, the fiber is dried or heated to obtain the fiber product treated with the present fiber treating agent.

The present microemulsion composition provides a fiber treating agent which has good storage stability and dilution ability. The agent provides excellent softness, particularly together with hydrophilicity, i.e. water absorbability, to attain improved texture of the fiber. Accordingly, the present microemulsion composition is widely usable to prepare a treating agent for a various fiber.

EXAMPLES

The present invention will be explained below in further detail with reference to a series of the Examples and the Comparative Examples, though the present invention is in no way limited by these Examples.

The viscosity described in the Examples was as determined at 25 degrees C. by a BM type viscometer, ex. Tokyo Keiki, Inc. The volatile matter content was as determined in a residue-on-heating method by a hot air circulation type thermostat, ex. Yamato Science, Co., Ltd. The HLB factor was calculated based on Griffin Method, i.e. HLB factor=20×(total formula weight of hydrophilic parts/molecular weight).

Preparation 1

In a separable flask having a volume of 500 ml, provided with a thermometer, a stirrer, a reflux condenser and a gas introduction tube, placed were 100 g of an aminoalkyl group-containing organopolysiloxane represented by the following formula (A), having a molecular weight of 4066, an amine equivalent of 1010 g/mol, a viscosity of 78 mm/s$^2$ and a volatile matter content of 2.1%; 52 g of polyethyleneglycol monobutyl monoglycidyl ether represented by the following formula (B), having a molecular weight of 349, the amount being such that a ratio of the number of glycidyl group in the polyethyleneglycol monobutyl monoglycidyl ether to the total number of hydrogen atoms bonding to nitrogen atoms in the aminoalkyl group-containing organopolysiloxane was 1.0; and 7.4 g of isopropyl alcohol. The flask was closed after introducing a nitrogen gas and, then, addition reaction was carried out at 80 degrees C. for 4 hours. After the reaction, low-boiling fractions were removed at 80 degrees C. and 10 mmHg of pressure for one hour to obtain 145 g of an oily compound represented by the following formula (C), hereinafter referred to as compound C. The appearance of the compound C was semi-transparent, pale yellow. It had a viscosity of 497 mPa·s, an amine equivalent of 2940 g/mol and a volatile matter content of 2.1%.

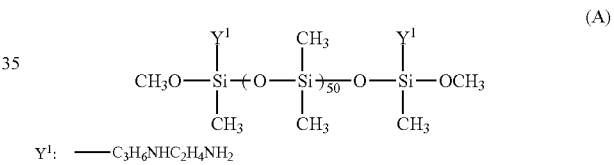

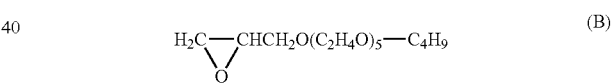

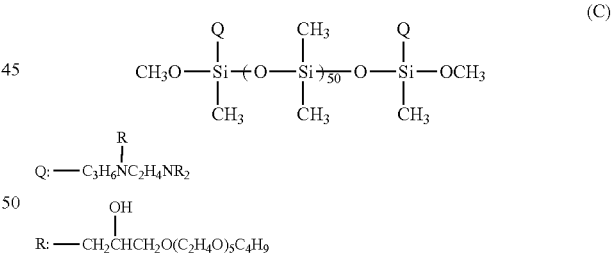

Example 1

In a 0.2 liter disposable cup made of polyethylene, placed were 90 g of the compound C; 6 g of polyoxyalkylene branched decyl ether, Noigen XL-80, HLB=13.8, ex. Dai-Ichi Kogyo Seiyaku Co., Ltd.; 2.7 g of an aqueous 25% solution of polyoxyethylene lauryl ether sodium sulfate, EMAL 20C, ex. Kao Corporation; and 1.3 g of acetic acid of 0.25 mol equivalent relative to the total mol equivalent of amino groups, i.e. —NR and —NR$^2$, in the compound C. These were mixed at 3500 rpm by a Homo Mixer for 20 minutes to phase-inversion emulsify. Subsequently, the mixture was stirred at 1500 rpm for 20 minutes to obtain a microemulsion composition which had pale yellow and transparent. The mass % of the components in the microemulsion composition are shown in the following Table 1. There, the amount of water is that of water contained in the aqueous solution of polyoxyethylene lauryl ether sodium sulfate. The amount of the anion surfactant was the amount of polyoxyethylene lauryl ether sodium sulfate. The values in the parentheses for the components (B) to (D) are the parts by mass of the component (B), (C) or (D), per 100 parts by mass of the component (A).

Example 2

The manner of Example 1 was repeated except that polyoxyethylene alkyl ether, EMULGEN 1108, HLB=13.4, ex. Kao Corporation, was used in place of polyoxyalkylene branched decyl ether to prepare a microemulsion composition. The mass % of the components in the microemulsion composition are shown in Table 1 below.

Example 3

The manner of Example 1 was repeated except that an ion exchanged water was used in place of the aqueous solution of polyoxyethylene lauryl ether sodium sulfate to prepare a microemulsion composition. The mass % of the components in the microemulsion composition are shown in Table 1 below.

Example 4

The manner of Example 1 was repeated except that the amount of the aqueous solution of polyoxyethylene lauryl ether sodium sulfate was changed to 2.2 g and the amount of acetic acid was changed to 1.8 g to prepare a microemulsion composition. The mass % of the components in the microemulsion composition are shown in Table 1 below.

Comparative Example 1

The manner of Example 1 was repeated except that Noigen XL-40, HLB=10.5, ex. Dai-Ichi Kogyo Seiyaku Co., Ltd. was used in place of Noigen XL-80 to prepare a microemulsion composition. The mass % of the components in the microemulsion composition are shown in Table 1 below.

Comparative Example 2

The manner of Example 1 was repeated except that Noigen XL-160, HLB=16.3, ex. Dai-Ichi Kogyo Seiyaku Co., Ltd. was used in place of Noigen XL-80 to prepare a microemulsion composition. The mass % of the components in the microemulsion composition are shown in Table 1 below.

Comparative Example 3

The same composition as Example 1 was adopted except that the amount of acetic acid was changed to 0.4 g and 0.9 g of phase-inversion water was added. The mixture was stirred at 3500 rpm for 20 minutes to phase-inversion emulsify. Subsequently, the mixture was stirred at 1500 rpm for 20 minutes to obtain a microemulsion composition which was pale yellow and transparent. The mass % of the components in the microemulsion composition are shown in Table 1 below.

Comparative Example 4

87 g of the compound C, 9 g of polyoxyalkylene branched decyl ether, Noigen XL-80, 3 g of acetic acid and 1 g of ion exchanged water were placed and stirred at 3500 rpm for 20 minutes by Homo Mixer to phase-inversion emulsify. Subsequently, the mixture was stirred at 1500 rpm for 20 minutes to obtain a microemulsion composition which was pale yellow and transparent. The mass % of the components in the microemulsion composition are shown in Table 1 below.

Comparative Example 5

98 g of the compound C, 1 g of polyoxyalkylene branched decyl ether, Noigen XL-80, and 1 g of acetic acid were placed and stirred at 3500 rpm for 20 minutes by Homo Mixer to phase-inversion emulsify. Subsequently, the mixture was stirred at 1500 rpm for 20 minutes to obtain a microemulsion composition which was pale yellow and transparent. The mass % of the components in the microemulsion composition are shown in Table 1 below.

Immediately after the preparation, a viscosity, a pH and an amount of non-volatile matters and a mean particle diameter of emulsion particles in the microemulsion compositions were determined in the following manners. The results will be shown in Table 2 below.

(1) A viscosity was determined at 25 degrees C. by a BM type viscometer, ex. Tokyo Keiki, Inc.

(2) A pH was determined at 25 degrees C. by a pH meter, ex. HORIBA, LTD.

(3) An amount of a non-volatile matter was determined with a residue-on-heating method by a hot air circulation type thermostat, ex. Yamato Science, Co., Ltd.

(4) A mean particle diameter of emulsion particles in the composition was determined by N4 Plus submicron Particle Size Analyzer, ex. Beckman Coulter, Inc.

Evaluation Test

The microemulsion compositions were evaluated in the following manners. The results will be shown in the following Table 2.

1. Evaluations of Dispersibility and Storage Stability in a Diluted State

The microemulsion composition was diluted with ion exchanged water to prepare a treating agent. The dispersibility of the microemulsion composition during dilution was evaluated. Further, appearance, i.e. Hazen color value, and storage stability of the treating agent was evaluated.

(1) Preparation of a Treating Agent of a 28% of Concentration 7 g of the microemulsion composition and 18 g of ion exchanged water were placed in a transparent glass bottle of 25 g and the bottle was closed with a stopper. Subsequently, the mixture was shaken at 250 rpm for 2 minutes with a shaking apparatus to prepare a treating agent.

(2) Preparation of a Treating Agent of a 13% of Concentration 2.8 g of the microemulsion composition and 18 g of ion exchanged water were placed in a transparent glass bottle of 25 g and the bottle was closed with a stopper. Subsequently, the mixture was shaken at 250 rpm for 2 minutes with a shaking apparatus to prepare a treating agent.

(3) Dispersibility

The dispersibility of the microemulsion compositions during the shaking was evaluated based on the following criteria.

A: The composition disperses completely in 2 minutes to become transparent.

B: The composition disperses almost in 2 minutes, but with some turbidity.

C: The composition does not disperse and become turbid or lumpy. Namely, the dilution does not become transparent.

(4) Evaluation of the Appearance of the Treating Agent

After shaking, the treating agent was let stand and its appearance was observed to determine a Hazen color value.

A Hazen color value, APHA, were determined by comparing the color between standard solutions and the sample. Specifically, ten standard solutions having an interval of 10 were provided for the range of the Hazen color value of from 10 to 100. Another ten standard solutions having an interval of 100 were provided for the range of the Hazen color value of from 100 to 1000. The color of the sample was compared with the standard solutions by the naked eye to determine which standard solution had color similar to the sample's color. The sample whose color was paler than the color of the standard solution having the Hazen color value of 10 was noted as "10 or less". When the sample was semi-translucent so that the judgment on color was difficult, the sample was noted as "unmeasurable".

(5) Evaluation of Storage Stability

The treating agents were stored at 25 degree C. for 30 days and, then, the appearance was observed to determine a Hazen color value according to the aforesaid manner.

2. Softening Property

Ion exchanged water was added to the microemulsion compositions to dilute to a solid content of 0.5 mass % to prepare test solutions. A broadcloth of polyester and cotton at 65%/35%, ex. Tanigashira Shoten, was dipped in the test solution for one minute, squeezed with rolls at a 100% squeezing ratio and, then, dried at 100 degrees C. for two minutes. Further, the cloth was heated at 150 degrees C. for two minutes to obtain a treated cloth for evaluation of a softening property. Three panelists touched the cloth to rate softness, based on the following criteria.

A: The texture is very good.
B: The texture is good.
C: The texture is bad.

3. Water Absorbability

Ion exchanged water was added to the microemulsion compositions to dilute to a solid content of 0.5 mass % to prepare a test solution. A cotton broadcloth was dipped in the test solution for one minute, squeezed with rolls at a 100% squeezing ratio and, then, dried at 100 degrees C. for two minutes. Further, the cloth was heated at 150 degrees C. for two minutes to obtain a treated cloth for evaluation of water absorbability. Each one drop of water was dropped on each of three spots on the surface of the treated cloth by a dropper, and a time for water to be completely absorbed into cloth was measured and rated, based on the following criteria.

A: Water is completely absorbed within 1 second.
B: Water is completely absorbed in more than 1 second to 30 seconds.
C: Water is not absorbed in more than 30 seconds.

4. Storage Stability 100 g of the microemulsion composition was put in a glass bottle, the bottle was left in a thermostat at 40 degrees C. for 30 days and, then, the appearance, and the non-volatile matters of the upper phase and the lower phase were observed by the naked eye and rated, based on the following criteria.

A: There is no separation into an upper layer and a lower layer with no graduation of color.
B: There is a little separation into an upper layer and the lower layer with slight graduation of color.
C: Complete separation into layers occurred.

5. Mechanical Stability

Ion exchanged water was added to the microemulsion compositions to dilute to 2 mass % and, then, stirred at 5000 rpm for 10 minutes with Homo Mixer. The surface was observed by the naked eye to evaluate mechanical stability, based on the following criteria.

A: There is no oil flotation and no interference membrane.
B: There is an interference membrane.
C: There is oil flotation.

TABLE 1

| Mass % | | Example 1 | Example 2 | Example 3 | Example 4 | Com. Exam. 1 |
|---|---|---|---|---|---|---|
| (A) | Organopolysiloxane, Compound C | 90 | 90 | 90 | 90 | 90 |
| (B) | Noigen XL-80, HLB: 13.8 | 6 (6.7) | | | 6 (6.7) | 6 (6.7) |
| | Emulgen 1108, HLB: 13.4 | | 6 (6.7) | | | |
| | Noigen XL-40, HLB: 10.5 | | | | | |
| | Noigen XL-160, HLB: 16.3 | | | | | 6 (6.7) |
| (C) | Anionic surfactant | 0.675 (0.75) | 0.675 (0.75) | 0 | 0.55 (0.6) | 0.675 (0.75) |
| (D) | Acetic acid | 1.3 (1.4) | 1.3 (1.4) | 1.3 (1.4) | 1.8 (2.0) | 1.3 (1.4) |
| | Molar equivalent per the amino group in compound C | 0.25 | 0.25 | 0.25 | 0.35 | 0.25 |
| (E) | Water | 2.025 | 2.025 | 2.7 | 1.65 | 2.025 |

| Mass % | | Com. Exam. 2 | Com. Exam. 3 | Com. Exam. 4 | Com. Exam. 5 |
|---|---|---|---|---|---|
| (A) | Organopolysiloxane, Compound C | 90 | 90 | 87 | 98 |
| (B) | Noigen XL-80, HLB: 13.8 | | 6 (6.7) | 9 (10.3) | 1 (1.0) |
| | Emulgen 1108, HLB: 13.4 | | | | |
| | Noigen XL-40, HLB: 10.5 | | | | |
| | Noigen XL-160, HLB: 16.3 | 6 (6.7) | | | |
| (C) | Anionic surfactant | 0.675 (0.75) | 0.675 (0.75) | 0 | 0 |
| (D) | Acetic acid | 1.3 (1.4) | 0.4 (0.4) | 3 (3.4) | 1 (1.0) |
| | Molar equivalent per the amino group in compound C | 0.25 | 0.08 | 0.58 | 0.19 |
| (E) | Water | 2.025 | 2.925 | 1 | 0 |

TABLE 2

|  |  |  | Example 1 | Example 2 | Example 3 | Example 4 | Com. Exam. 1 | Com. Exam. 2 | Com. Exam. 3 | Com. Exam. 4 | Com. Exam. 5 |
|---|---|---|---|---|---|---|---|---|---|---|---|
| Properties | Appearance | | Light yellow transparence | | | | | | | | |
|  | Viscosity, 25 degrees C. | mPa·s | 1450 | 1640 | 1290 | 1470 | 1340 | 1490 | 1100 | 3600 | 1500 |
|  | pH | | 7.1 | 7.2 | 7.1 | 6.7 | 7.2 | 7.2 | 7.5 | 6.2 | 7.6 |
|  | Volatile matter, 105 degrees C., 3 h | % | 94.2 | 94.2 | 91.7 | 94.5 | 92.7 | 94.1 | 94.4 | 93.1 | 95.5 |
|  | Mean particle diameter | nm | 40 | 30 | 30 | 50 | 80 | 120 | 100 | 40 | 450 |
| Evaluation | 1. Evaluations of dispersibility and storage stability in a diluted state | | | | | | | | | | |
|  | Treating agent of a 28% of concentration | Dispersibility | A | A | A | A | C | B | C | C | C |
|  |  | Viscosity, 25 degrees C. mPa·s | 20 | 25 | 70 | 50 | 80 | 100 | 90 | 290 | 150 |
|  |  | Appearance immediately after the preparation | 10 or less | 10 or less | 10 or less | 10 or less | Unmeasurable | Unmeasurable | Unmeasurable | Unmeasurable | Unmeasurable |
|  |  | Appearance after the storage | 10 or less | 10 or less | 10 or less | 10 or less | Unmeasurable | Unmeasurable | Unmeasurable | Unmeasurable | Unmeasurable |
|  | Treating agent of a 13% of concentration | Dispersibility | A | A | A | A | C | B | B | C | C |
|  |  | Appearance immediately after the preparation | 10 or less | 10 or less | 10 or less | 10 or less | 10 or less | 10 or less | Unmeasurable | Unmeasurable | Unmeasurable |
|  |  | Appearance after the storage | 10 or less | 10 or less | 10 or less | 10 or less | Unmeasurable | Unmeasurable | Unmeasurable | Unmeasurable | Unmeasurable |
|  | 2. Softness | | A | A | A | A | A | A | A | A | A |
|  | 3. Water absorbability | | A | A | A | A | A | A | A | A | A |
|  | 4. Storage stability | | A | A | A | A | C | B | C | C | C |
|  | 5. Mechanical stability | | A | A | A | A | C | B | C | C | C |

As shown in Table 2, the present microemulsion composition comprising an amino and polyoxyalkylene groups-containing organopolysiloxane at a high concentration shows transparent and colorless appearance in the broad dilution range and, further, has excellent storage stability. The fiber treating agent prepared by diluting the present microemulsion composition has excellent storage stability and mechanical stability. Additionally, the fiber treated with the present fiber treating agent had an excellent softness and water absorbability.

INDUSTRIAL APPLICABILITY

The present microemulsion composition is easily prepared in simple procedures and provides a fiber treating agent which has good storage stability and dilution ability. Further, the agent provides an excellent softness, particularly together with hydrophilicity, i.e. water absorbability, to a fiber and has, therefore, an excellent effect of improving texture of the fiber. Accordingly, the present microemulsion composition is widely usable as a treating agent for various fibers.

The invention claimed is:
1. A microemulsion composition comprising the following components (A) to (E):
(A) a linear organopolysiloxane having a group represented by the following formula (i) and a viscosity at 25 degrees C. of 100 to 5,000 mPa·s in an amount of 80 to 98 mass %, based on the whole mass of the composition,

(i)

wherein
$R^5$ is a divalent hydrocarbon group having 1 to 8 carbon atoms;
a is an integer of from 0 to 4; and
each $R^6$ is, independently of each other, a hydrogen atom or a polyoxyalkylene-containing organic group represented by
—$CH_2$—$CH(OH)CH_2O$—$(C_2H_4O)_b$—$(C_3H_6O)_c$—Z, wherein
Z is one selected from a hydrogen atom, substituted or unsubstituted monovalent hydrocarbon groups having 1 to 12 carbon atoms and acyl groups,
b is an integer of from 2 to 30,
c is an integer of from 0 to 20, and
the oxyethylene unit and the oxypropylene unit may form a block polymeric part or a random polymeric part; wherein
the linear organopolysiloxane has two or more polyoxyalkylene-containing moieties per molecule of the linear organopolysiloxane, where each of the two or more polyoxyalkylene-containing moieties are represented by the polyoxyalkylene-containing organic group represented by —$CH_2$—$CH(OH)CH_2O$—$(C_2H_4O)_b$—$(C_3H_6O)_c$—Z,
(B) one or more kinds of nonionic surfactant, wherein the component (B) has an HLB factor of 12 to 16, in an amount of 1 to 10 parts by mass, based on 100 parts by mass of the component (A),
(C) an anionic surfactant in an amount of 0 to 3 parts by mass, based on 100 parts by mass of the component (A),
(D) an organic acid in an amount of 0.5 to 2 parts by mass, based on 100 parts by mass of the component (A), and
(E) water in an amount of 1 to 5 mass %, based on the whole mass of the composition.

2. The microemulsion composition according to claim 1, wherein
the linear organopolysiloxane is at least one selected from the group consisting of organopolysiloxanes represented by the following general formulas (1), (2) and (3):

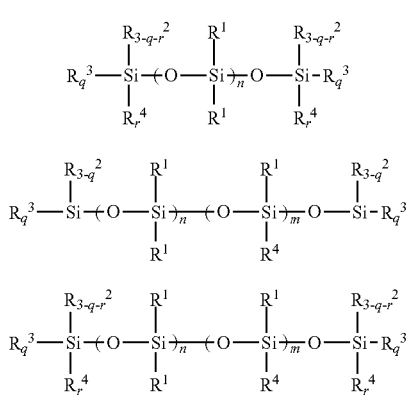

wherein
$R^2$ is, independently of each other, a substituted or unsubstituted monovalent hydrocarbon group having 1 to 12 carbon atoms;
$R^3$ is, independently of each other, a group represented by -OX, wherein X is a hydrogen atom or $R^2$;
$R^1$ is, independently of each other, $R^2$ or $R^3$;
q is, independently of each other, an integer of from 0 to 3;
r is, independently of each other, 0 or 1; and a total of q and r is 0 to 3 at each of the terminals, provided that the formulas (1) and (3) have $R^4$ at at least one terminal;
n is an integer of from 10 to 200;
$R^4$ is, independently of each other, a group represented by the formula (i); and
m is an integer of from 1 to 5, provided that for formula (2) either
m an integer of from 2 to 5, or
when m is 1, the $R^4$ group resented by the formula (i) has two or more $R^6$ that are represented by the polyoxyalkylene-containing organic group resented by —$CH_2$—$CH(OH)CH_2O$—$(C_2H_4O)^b$—$(C_3H_6O)_c$—Z.

3. The microemulsion composition according to claim 1, wherein a mean particle diameter of emulsion particles present in the composition is 50 nm or less.

4. The microemulsion composition according to claim 1, wherein the nonionic surfactant is a polyoxyalkylene alkyl ether.

5. The microemulsion composition according to claim 1, wherein 67% or more of the total number of the groups represented by $R^6$ is a group represented by —$CH_2$—$CH(OH)CH_2O$—$(C_2H_4O)_b$—$(C_3H_6O)_c$—Z, wherein b, c and Z are as defined above.

6. A fiber treating agent comprising the microemulsion composition according to claim 1 in an amount of 0.5 to 30 mass %, based on the whole mass of the agent.

7. The microemulsion composition according to claim 1, wherein the viscosity at 25 degrees C. of Component (A) is in a range of from 100 to 1,000 mPa·s.

* * * * *